(12) United States Patent
Akagi et al.

(10) Patent No.: US 8,986,630 B2
(45) Date of Patent: Mar. 24, 2015

(54) GAS-GENERATING MATERIAL AND MICRO PUMP

(71) Applicant: Sekisui Chemical Co., Ltd., Osaka, Osaka (JP)

(72) Inventors: Yoshinori Akagi, Osaka (JP); Shigeru Nomura, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/822,634

(22) PCT Filed: Sep. 25, 2012

(86) PCT No.: PCT/JP2012/074511
§ 371 (c)(1),
(2) Date: Mar. 12, 2013

(87) PCT Pub. No.: WO2013/183175
PCT Pub. Date: Dec. 12, 2013

(65) Prior Publication Data
US 2014/0161687 A1    Jun. 12, 2014

(30) Foreign Application Priority Data
Jun. 8, 2012   (JP) ................. 2012-131386

(51) Int. Cl.
   C06B 43/00    (2006.01)
   B82B 1/00     (2006.01)
   C06D 5/00     (2006.01)
   B01L 3/00     (2006.01)

(52) U.S. Cl.
   CPC . C06B 43/00 (2013.01); B82B 1/00 (2013.01); C06D 5/00 (2013.01); B01L 3/50273 (2013.01); B01L 2400/046 (2013.01)

USPC ........ 422/505; 137/14; 149/109.2; 149/109.4

(58) Field of Classification Search
   None
   See application file for complete search history.

(56) References Cited

U.S. PATENT DOCUMENTS

| | | | |
|---|---|---|---|
| 3,681,271 A * | 8/1972 | Yokoo et al. | 521/126 |
| 2003/0077204 A1 | 4/2003 | Seki et al. | |
| 2004/0123925 A1 | 7/2004 | Wu | |
| 2006/0035995 A1 * | 2/2006 | Ishizawa et al. | 522/7 |
| 2009/0126516 A1 | 5/2009 | Yamamoto et al. | |
| 2011/0014096 A1 | 1/2011 | Fukuoka et al. | |

(Continued)

FOREIGN PATENT DOCUMENTS

| CN | 1556782 A | 12/2004 |
|---|---|---|
| CN | 101400432 A | 4/2009 |

(Continued)

OTHER PUBLICATIONS

International Search Report for the Application No. PCT/JP2012/074511 mailed Oct. 30, 2012.

(Continued)

*Primary Examiner* — Jill Warden
*Assistant Examiner* — Timothy G Kingan
(74) *Attorney, Agent, or Firm* — Cheng Law Group, PLLC

(57) ABSTRACT

Provided is a gas-generating material which can generate a gas in a large amount per unit time and has high storage stability.
The gas-generating material 11a according to the present invention comprises a gas-generating agent that is an azo compound or an azide compound, a tertiary amine, a photosensitizing agent and a binder resin.

24 Claims, 5 Drawing Sheets

(56) References Cited

U.S. PATENT DOCUMENTS

| | | |
|---|---|---|
| 2011/0044863 A1 | 2/2011 | Fukuoka et al. |
| 2011/0129392 A1* | 6/2011 | Yamamoto et al. ........... 422/186 |
| 2014/0134075 A1 | 5/2014 | Fukuoka et al. |

FOREIGN PATENT DOCUMENTS

| | | |
|---|---|---|
| CN | 102146905 A | 8/2011 |
| CN | 102741559 A | 10/2012 |
| JP | 8-109093 A | 4/1996 |
| JP | 8-310888 A | 11/1996 |
| JP | 10-298168 A | 10/1998 |
| JP | 2005-197630 A | 7/2005 |
| JP | 2006-128621 A | 5/2006 |
| JP | 2010-89259 A | 4/2010 |
| JP | 2012-62238 A | 3/2012 |

OTHER PUBLICATIONS

Written Opinion of the International Searching Authority (PCT/ISA/237) for Application No. PCT/JP2012/074511 mailed Oct. 30, 2012.
Sonobe, Tadashi et al., "Synthesis of GAP", Journal of Industrial Explosives Society (Kögyö Kayaku), 1990, vol. 51, No. 4, pp. 216-221.
Written Opinion of the International Searching Authority (PCT/ISA/237) for Application No. PCT/JP2012/074511 mailed Oct. 30, 2012 (English Translation mailed Dec. 18, 2014).
The First Office Action for the Application No. 201280001957.7 from The State Intellectual Property Office of the People's Republic of China dated Oct. 10, 2014.

* cited by examiner

GAS-GENERATING MATERIAL AND MICRO PUMP

TECHNICAL FIELD

The present invention relates to a gas-generating material and a micro pump provided with the gas-generating material.

BACKGROUND ART

In recent years, analysis apparatuses each equipped with a microfluidic device have been used as analysis apparatuses having small sizes and excellent portability. In the analysis apparatuses each equipped with a microfluidic device, the sending, dilution, concentration, analysis and so on of a sample can be carried out in a micro flow path.

In the microfluidic device, a micro pump is provided for the purpose of sending a sample or the like in the micro flow path. For example, Patent Document 1 discloses a micro pump produced using a light-responsive gas-generating material.

Patent Document 2 discloses a gas-generating agent which comprises an aliphatic polyether having an azidomethyl group and a hydroxy group in side chains. Patent Document 3 discloses a composition containing a glycidyl azide polymer. Non-patent document 1 discloses a glycidyl azide polymer (GAP) having a methyl azide group in a side chain as a terminal-hydroxy-group polyether and a method for producing the glycidyl azide polymer (GAP).

Patent Documents 4 and 5 do not disclose any use application of a micro pump, but disclose compositions each containing a gas-generating agent.

In Patent Document 4, it is described that the surface of a glass plate having, attached thereto, a layer containing a gas-generating agent is treated with a silane coupling agent. In Patent Document 4, the silane coupling agent is not contained in the layer containing the gas-generating agent.

Patent Document 5 discloses a multilayer sheet which comprises a layer containing a gas-generating agent and a layer containing an amino-type silane coupling agent. In Patent Document 5, the layers in the multilayer sheet are formed using different compositions from each other, and the gas-generating agent and the amino-type silane coupling agent are used separately in different layers.

PRIOR ART DOCUMENTS

Prior Art Document

Patent Document

Patent Document 1 JP 2010-89259 A
Patent Document 2 JP 8-310888 A
Patent Document 3 JP 8-109093 A
Patent Document 4 JP 2005-197630 A
Patent Document 5 JP 2006-128621 A

Non-Patent Document

Non-patent Document 1 Journal of Industrial Explosives Society (Kogyo Kayaku), Vol. 51, No. 4, 1990, P. 216-217

SUMMARY OF THE INVENTION

Problems to be Solved by the Invention

In recent years, as the result of the increase in complexity of microfluidic devices or the like, it has been demanded to simplify the structures of micro pumps, reduce the sizes of the micro pumps, and mount the micro pumps at higher densities.

The main object of the present invention is to provide a gas-generating material which can generate a gas in a large amount per unit time and has high storage stability. The present invention also provides a micro pump involving the gas-generating material.

Means for Solving the Problems

The gas-generating material according to the present invention comprises a gas-generating agent that is an azo compound or an azide compound, a tertiary amine, a photosensitizing agent and a binder resin.

The tertiary amine preferably comprises at least one component selected from the group consisting of a cyclic amine, a trialkylamine and an aromatic amine.

The content of the tertiary amine is preferably 0.1 to 50 parts by mass inclusive relative to 100 parts by mass of the gas-generating agent.

The azide compound preferably has a sulfonylazide group or an azidomethyl group.

The content of the photosensitizing agent is preferably 0.1 to 50 parts by mass inclusive relative to 100 parts by mass of the gas-generating agent.

The photosensitizing agent preferably comprises at least one component selected from the group consisting of a thioxanthone compound, a phenothiazine compound, an anthracene compound and an acridone compound.

It is more preferred that the gas-generating material according to the present invention additionally comprises a silane coupling agent.

The micro pump according to the present invention is provided with the gas-generating material and a base having a micro flow path formed therein. The gas-generating material is so arranged that a gas generated in the gas-generating material is supplied to the micro flow path.

Effect of the Invention

According to the present invention, a gas-generating material can be provided, which can generate a gas in a large amount per unit time and has high storage stability.

MODE(S) FOR CARRYING OUT THE INVENTION

Figure 1:
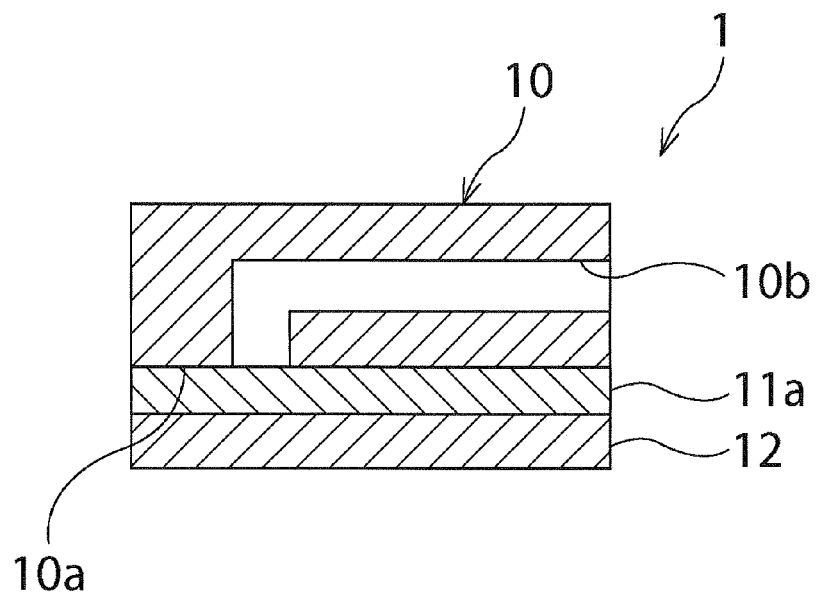
FIG. 1 illustrates a schematic cross-sectional view of a micro pump according to a first embodiment of the present invention.

Hereinafter, one example of preferred embodiments of the present invention is described. However, the embodiment mentioned below is merely illustrative. The present invention is not limited to the below-mentioned embodiment in any way.

The drawings which are referred in this embodiment are illustrated schematically, in which the ratios of sizes and so on of an object illustrated in the drawings may sometimes different from those of an actual one. Specific ratios of sizes and so on of the object should be considered with taking the statements mentioned below into consideration.

FIG. 1 is a schematic cross-sectional view of a micro pump according to a first embodiment. As illustrated in FIG. 1, the micro pump 1 is equipped with a sheet-like base 10. The base 10 can be composed of, for example, a resin, a glass or a ceramic. Examples of the resin that constitutes the base 10 include an organosiloxane compound, a polymethacrylate resin and a cyclic polyolefin resin. Specific examples of the organosiloxane compound include polydimethylsiloxane (PDMS) and polymethylhydrosiloxane.

In the base 10, a micro flow path 10b which is opened to the main surface 10a of the base 10 is formed.

The term "micro flow path" refers to a flow path which is formed in such a shape/size that a liquid flowing through the micro flow path can exhibit a so-called "micro effect". Specifically, the "micro flow path" refers to a flow path which is formed in such a shape/size that a liquid flowing through the micro flow path can be strongly affected by surface tension and capillarity and consequently can exhibit a different behavior from the behavior of a liquid that flows through a flow path having an ordinary size.

On the main surface 10a, a film-like gas-generating material 11a is attached. An opening of the micro flow path 10b is covered with the gas-generating material 11a. Therefore, a gas generated from the gas-generating material 11a upon the application of an external stimulus such as light or heat is applied to the gas-generating material 11a is introduced to the micro flow path 10b.

The thickness of the gas-generating material 11a is not particularly limited. For example, the thickness is preferably 5 μm or more, more preferably 10 μm or more, and preferably 5 mm or less, more preferably 500 μm or less.

The gas-generating material 11a is covered with a gas barrier layer 12. The gas barrier layer 12 can prevent the outflow of a gas generated in the gas-generating material 11a into the opposite side of the main surface 10a, and enables the efficient supply of the gas into the micro flow path 10b. Therefore, the gas barrier layer 12 is preferably a layer through which the gas generated in the gas-generating material 11a can permeate at a poor rate.

The gas barrier layer 12 can be composed of, for example, a polyacrylic resin, a polyolefin resin, a polycarbonate resin, a vinyl chloride resin, an ABS resin, a polyethylene terephthalate (PET) resin, a nylon resin, a urethane resin, a polyimide resin, a glass or the like.

The thickness of the gas barrier layer 12 may vary depending on type of the material for the gas barrier layer 12 or the like. For example, the thickness is preferably 10 μm or more, more preferably 25 μl or more, and preferably 1 mm or less, more preferably 100 μm or less. When light is to be transmitted through the gas barrier layer 12, the gas barrier layer 12 is preferably a layer in which the attenuation of light of an ultraviolet ray region rarely occurs.

The gas-generating material 11a contains a gas-generating agent. The gas-generating agent is an azo compound or an azide compound. The gas-generating agent can generate a gas upon the application of an external stimulus such as heat or light. The azo compound or the azide compound is not particularly limited, and any known azo compound or azide compound can be used. The gas-generating agent is preferably the azo compound, and is also preferably the azide compound. Any one type of the above-mentioned gas-generating agents may be used singly, or any two or more types of the gas-generating agents may be used in combination.

Specific examples of the azo compound to be used as the gas-generating agent include 2,2'-azobis(N-cyclohexyl-2-methylpropionamide), 2,2'-azobis[N-(2-methyl propyl)-2-methylpropionamide], 2,2'-azobis(N-butyl-2-methylpropionamide), 2,2'-azobis[N-(2-methylethyl)-2-methylpropionamide], 2,2'-azobis(N-hexyl-2-methylpropionamide), 2,2'-azobis(N-propyl-2-methylpropionamide), 2,2'-azobis(N-ethyl-2-methylpropionamide), 2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis[2-(5-methyl-2-imidazoylin-2-yl)propane]dihydrochloride, 2,2'-azobis[2-(2-imidazoylin-2-yl)propane]dihydrochloride, 2,2'-azobis[2-(2-imidazoylin-2-yl)propane]disulfatedihydrate, 2,2'-azobis[2-(3,4,5,6-tetrahydropyrimidin-2-yl)propane]dihydrochloride, 2,2'-azobis{2-[1-(2-hydroxyethyl)-2-imidazoylin-2-yl]propane}dihydrochloride, 2,2'-azobis[2-(2-imidazoylin-2-yl)propane], 2,2'-azobis(2-methylpropionamidine) hydrochloride, 2,2'-azobis(2-aminopropane)dihydrochloride, 2,2'-azobis[N-(2-carboxyacyl)-2-methyl-propionamidine], 2,2'-azobis{2-[N-(2-carboxyethyl)amidine]propane}, 2,2'-azobis(2-methylpropionamidoxime), dimethyl-2,2'-azobis(2-methylpropionate), dimethyl-2,2'-azobisisobutyrate, 4,4'-azobis(4-cyancarbonic acid), 4,4'-azobis(4-cyanopentanoic acid) and 2,2'-azobis(2,4,4-trimethylpentane). Each of these azo compounds can generate a nitrogen gas upon the application of an external stimulus such as light of a specific wavelength region or heat.

The azo compound does not generate any gas when subjected to an impact, and is therefore extremely easy to handle. Further, the azo compound does not cause any chain reaction, and therefore does not generate a gas explosively. When the azo compound is used, the generation of a gas can be halted by halting the irradiation with light. Therefore, the control of the amount of a generated gas can be achieved easily using the azo compound as the gas-generating agent.

Examples of the azide compound to be used as the gas-generating agent include azide compounds each having a sulfonylazide group or an azidomethyl group. The azide compound preferably has a sulfonylazide group or an azidomethyl group. The azide compound preferably has a sulfonylazide group, and also preferably has an azidomethyl group.

A preferred example of the compound having a sulfonylazide group is a compound represented by formula (1) shown below.

[Chemical formula 1]

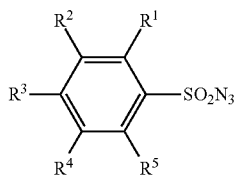

(1)

In formula (1), $R^1$ to $R^5$ independently represent a hydrogen atom, a halogen atom, an amino group, an amide group, a hydrocarbon group, a group formed by binding a substituent to a hydrocarbon group, or an alkoxy group. In formula (1), $R^1$ to $R^5$ may be the same as or different from one another. The hydrocarbon group may be linear, branched or cyclic. The hydrocarbon group may be a saturated hydrocarbon group or an unsaturated hydrocarbon group. The alkoxy group may have a substituent, and may be linear or branched.

In formula (1), at least one of $R^1$ to $R^5$ is preferably a hydrocarbon group or a group formed by binding a substituent to a hydrocarbon group, and more preferably a hydrocarbon group. When each of $R^1$ to $R^5$ is a hydrocarbon group or a group formed by binding a substituent to a hydrocarbon group, the number of carbon atoms in the hydrocarbon group is 1 or more, preferably 3 or more, more preferably 6 or more, and preferably 30 or less, more preferably 20 or less, further preferably 18 or less. Examples of the substituent in the group formed by binding a substituent to a hydrocarbon group include a halogen atom and so on.

In $R^1$ to $R^5$ in formula (1), the number of carbon atoms in the alkoxy group is 1 or more, preferably 3 or more, more preferably 6 or more, and preferably 20 or less, more preferably 16 or less, further preferably 12 or less. When the alkoxy group has a substituent, examples of the substituent include a halogen atom and the like.

In formula (1), $R^3$ is preferably an amide group, a hydrocarbon group, a group formed by binding a substituent to a hydrocarbon group, or an alkoxy group. In formula (1), it is preferred that each of $R^1$, $R^2$, $R^4$ and $R^5$ is a hydrogen atom.

An example of the azide compound having an azidomethyl group is a glycidyl azide polymer. The glycidyl azide polymer is preferably an aliphatic polyether having an azidomethyl group in a side chain and having a hydroxy group at the terminal.

A preferred example of the aliphatic polyether having an azidomethyl group in a side chain and having a hydroxy group at the terminal is an azide compound represented by formula (2-1).

$$H(B)_q(A)_nOR^1O(A)_m(B)_rH \qquad (2-1)$$

In formula (2-1), m+n=2 to 20, m is 1 or more, n is 1 or more, q+r=10 to 35, q is 5 or more, r is 5 or more, A is —OCH$_2$CH$_2$CH$_2$CH$_2$—, —OCH$_2$CH$_2$— or —OCH$_2$CH (CH$_3$)—, B is —CH$_2$CH(CH$_2$N$_3$) O—, $R^1$ is —CH$_2$CH$_2$—, —CH$_2$CH$_2$CH$_2$CH$_2$—, —CH$_2$CH(CH$_3$)—, —[(CH$_2$CH$_2$ O)$_x$CH$_2$CH$_2$]— or —[(CH$_2$CH$_2$CH$_2$CH$_2$O)$_y$ CH$_2$CH$_2$CH$_2$CH$_2$]—, x in the $R^1$ is 10 to 25, and y in the $R^1$ is 5 to 20.

Another preferred example of the aliphatic polyether having an azidomethyl group in a side chain and having a hydroxy group at the terminal is an azide compound represented by formula (2-2) shown below.

[Chemical formula 2]

(2-2)

In formula (2-2) shown above, m represents an integer of 1 to 20, l+n is an integer of 7 to 50, m is preferably 3 or more and preferably 15 or less, and l+n is preferably 10 or more and preferably 30 or less.

Still another preferred example of the aliphatic polyether having an azidomethyl group in a side chain and having a hydroxy group at the terminal is an azide compound represented by formula (2-3) shown below.

[Chemical formula 3]

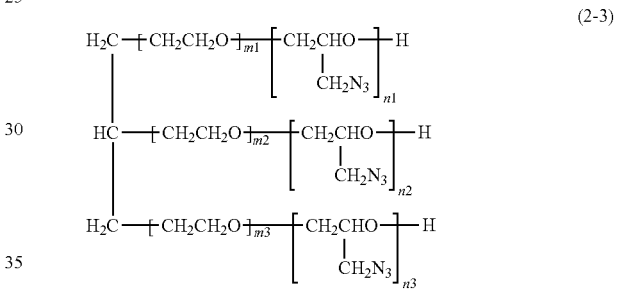

(2-3)

In formula (2-3) shown above, m1, m2 and m3 independently represent an integer of 1 to 20, and n1, n2 and n3 independently represent an integer of 1 to 20.

The azide compound is preferably an azide compound represented by formula (1), (2-1), (2-2) or (2-3) shown above. The azide compound is preferably an azide compound represented by formula (1) shown above, and is also preferably an azide compound represented by formula (2-1), (2-2) or (2-3) shown above.

The above-mentioned azide compound can be decomposed upon being subjected to an external stimulus such as light of a specific wavelength range, heat, an ultrasonic wave or an impact to generate a nitrogen gas.

In the gas-generating material 11a, the content of the gas-generating agent is preferably 10 mass % or more, more preferably 15 mass % or more, further preferably 20 mass % or more, and preferably 90 mass % or less, more preferably 70 mass % or less, further preferably 60 mass % or less. When the content of the gas-generating agent is equal to or more than the above-mentioned lower limit, a sufficient amount of a gas can be generated. Since the gas-generating material 11a is required to contain a tertiary amine, a photosensitizing agent and a binder resin, the preferred upper limit of the content of the gas-generating agent is about 90 mass %.

In the gas-generating material 11a, the above-mentioned generation of a nitrogen gas can be achieved smoothly and the amount of the generated gas can be increased when the tertiary amine and the photosensitizing agent mentioned above are contained.

The gas-generating material 11a contains a tertiary amine. The type of the tertiary amine is not particularly limited. Examples of the tertiary amine include a cyclic amine, a trialkylamine and an aromatic amine. Each of the cyclic amine and the aromatic amine has a tertiary amine structure.

Any one of the above-mentioned tertiary amines may be contained singly, or any two or more of the above-mentioned tertiary amines may be contained in combination. The gas-generating material 11a preferably contains at least one component selected from the group consisting of a cyclic amine, a trialkylamine and an aromatic amine. The tertiary amine is preferably a cyclic amine, is also preferably a trialkylamine, and is also preferably an aromatic amine. The cyclic amine has a cyclic skeleton other than an aromatic skeleton, and does not have any aromatic skeleton. The trialkylamine does not have any cyclic skeleton and does not have any aromatic skeleton. The aromatic amine has an aromatic skeleton, and does not have any cyclic skeleton other than an aromatic skeleton.

The number of carbon atoms in the cyclic amine is preferably 6 or more and preferably 20 or less. Specific examples of the cyclic amine include 1,4-diazabicyclo[2.2.2]octane (DABCO), diazabicycloundecene (DBU) and diazabicyclononene (DBN).

The three alkyl groups in the trialkylamine may be the same as or different from one another. The number of carbon atoms in each of the three alkyl groups in the trialkylamine is 1 or more, preferably 2 or more and preferably 20 or less, more preferably 6 or less. Specific examples of the trialkylamine include trimethylamine, N,N-diethylmethylamine, N,N-dimethylethylamine, triethylamine, N,N-dimethylpropylamine, tripropylamine and tributylamine.

Specific examples of the aromatic amine include N,N-dimethylaminotoluidine, N,N-diethylaminotoluidine, N,N-dimethylaminobenzene, N,N-diethylaminobenzene and N,N,N'N'-tetramethyl-p-phenylenediamine.

For the purpose of increasing the solubility in the gas-generating material 11a, further increasing the miscibility with other components, and obtaining a uniform film-like gas-generating material, it is preferred that the tertiary amine has a liquid form at 23° C.

The content of the tertiary amine is preferably 0.1 part by mass or more, more preferably 0.5 parts by mass or more, further preferably 1 part by mass or more, and preferably 50 parts by mass or less, more preferably 40 parts by mass or less, further preferably 30 parts by mass or less, relative to 100 parts by mass of the gas-generating agent. When the content of the tertiary amine is equal to or more than the lower limit and equal to or less than the upper limit, the amount of the generated gas per unit time in the gas-generating material 11a can be increased effectively and the storage stability can be improved effectively.

The gas-generating material 11a contains a photosensitizing agent. The photosensitizing agent has an effect of amplifying the stimulation to the gas-generating agent by light. Therefore, when the gas-generating material 11a contains a photosensitizing agent, it becomes possible to generate a gas and release a gas with a small amount of light irradiation. It also becomes possible to generate and release a gas with light having a wavelength falling within a broader wavelength region. Any one type of the photosensitizing agent may be used singly, or any two or more types of the photosensitizing agents may be used in combination.

The type of the photosensitizing agent is not particularly limited. As the photosensitizing agent, any known photosensitizing agent can be used. Examples of the photosensitizing agent include a thioxanthone compound, a phenothiazine compound, an anthracene compound and an acridone compound. The thioxanthone compound has a thioxanthone skeleton. The phenothiazine compound has a phenothiazine skeleton. The anthracene compound has an anthracene skeleton. The acridone compound has an acridone skeleton.

Specific examples of the thioxanthone compound include thioxanthone, 2-chlorothioxanthone, 2,4-dichlorothioxanthone, 1-chloro-4-propoxythioxanthone, 2-isopropylthioxanthone, 4-isopropylthioxanthone and 2,4-diethylthioxanthone.

Specific examples of the phenothiazine compound include phenothiazine, 2-chlorophenothiazine, 2-methylthiophenothiazine, 2-methoxyphenothiazine and 2-(trifluoromethyl) phenothiazine.

Specific examples of the anthracene compound include anthracene, 9,10-diethoxyanthracene, 9,10-dipropxyanthracene, 9,10-dibutoxyanthracene, 9-carboxyanthracene, 2-anthracenecarboxylic acid, 1-anthracenecarboxylic acid, dimethyl 1,8-anthracenedicarboxylate, (1R,2R)-2-(anthracene-2,3-dicarboxylmide)cyclohexanecarboxylic acid, 1-aminoanthracene, 2-anthraceneboronic acid, 9-chloromethylanthracene, sodium 9,10-dimethoxyanthracene-2-sulfonate, benzanthrene, benz[a]anthracene-7,12-dione, dibenz[a,c]anthracene, 1,2,3,4-dibenzanthracene, 9-bromoanthracene, 9,10-bis(chloromethyl)anthracene, 7-bromobenz[a]anthracene, 1,8-bis(hydroxymethyl)anthracene, 9,10-bis(3,5-dihydroxyphenyl)anthracene, 1-bromoanthracene, 2-bromoanthracene, 9,10-bis(diethylphosphonomethyl)anthracene, 2-bromo-9,10-diphenylanthracene, 2-t-butylanthracene, 9-chloromethylanthracene, 9-cyanoanthracene, 1-chloro-9,10-bis(phenylethynyl)anthracene, 2-chloroanthracene, dibenz[a,h]anthracene, 9,10-dibromoanthracene, 9,10-dimethylanthracene, 9,10-dihydroanthracene, 7,12-dimethylbenz[a]anthracene, 9,10-dicyanoanthracene, 9,10-diphenylanthracene, 2,3-dimethylanthracene, 2,6-dibromoanthracene, 1,5-dibromoanthracene, (11R,12R)-9,10-dihydro-9,10-ethanoanthracene-11,12-diamine, 9,10-dihydro-9,10-bis(2-carboxyethyl)-N-(4-nitrophenyl)-10,9-(epoxyimino)anthracene-12-carboxamide, 9,10-di(1-naphthyl)anthracene, 9,10-di(2-naphthyl)anthracene, 1,8-diiodoanthracene, 9-(hydroxymethyl)anthracene, 2-(hydroxymethyl)anthracene, 9-(2-hydroxyethyl)anthracene, 9-methylanthracene, 7-methylbenz[a]anthracene, 2,3-benzanthracene, dibenz[de,kl]anthracene, 9-phenylanthracene, 9,10-bis(phenylethynyl)anthracene, 1-anilinoanthracene, 2-anilinoanthracene, 1,4,9,10-tetrahydroxyanthracene, 1,8,9-trihydroxyanthracene, (R)-(−)-α-(trifluoromethyl)-9-anthracenemethanol, (S)-(+)-α-(trifluoromethyl)-9-anthracenemethanol and 9,10-dihydro-9,10-[1,2]benzenoanthracene.

Specific examples of the acridone compound include 10-methyl-9(10H)acridone, 9(10H)-acridone and 10-butyl-2-chloro-9(10H)-acridone.

For the purpose of increasing the amount of a generated gas per unit time, it is preferred that the photosensitizing agent comprises at least one compound selected from the group consisting of a thioxanthone compound, a phenothiazine compound, an anthracene compound and an acridone compound. The photosensitizing agent is preferably a thioxanthone compound, is preferably a phenothiazine compound, is preferably an anthracene compound, and is also preferably an acridone compound.

As for the photosensitizing agent, a polycyclic aromatic compound having an alkoxy group may also be mentioned. The polycyclic aromatic compound may have two or more alkoxy groups. Particularly, a polycyclic aromatic compound having an alkoxy group containing a glycidyl group or a hydroxy group is preferred. The polycyclic aromatic compound of this type is preferably a substituted alkoxy polycyclic aromatic compound having an alkoxy group in which a part of the alkoxy group is substituted by a glycidyl group or a hydroxy group. This photosensitizing agent has high sublimation resistance, and therefore can be used under high-temperature conditions. Further, since a part of the alkoxy group is substituted by a glycidyl group or a hydroxy group, the solubility in the gas-generating material 11a can be increased and the occurrence of bleeding out can be prevented.

A preferred example of the polycyclic aromatic compound to be used as the photosensitizing agent is a polycyclic aromatic compound having an anthracene skeleton. The polycyclic aromatic compound having the anthracene skeleton is an anthracene compound having an alkoxy group, and includes an anthracene derivative and the like. In the polycyclic aromatic compound having an alkoxy group, the number of carbon atoms in the alkoxy group is 1 or more, preferably 18 or less, more preferably 8 or less.

Specific example of the polycyclic aromatic compound having the alkoxy group include 9,10-dimethoxyanthracene, 2-ethyl-9,10-dimethoxyanthracene, 2-t-butyl-9,10-dimethoxyanthracene, 2,3-dimethyl-9,10-dimethoxyanthracene, 9-methoxy-10-methylanthracene, 9,10-diethoxyanthracene, 2-ethyl-9,10-diethoxyanthracene, 2-t-butyl-9,10-diethoxyanthracene, 2,3-dimethyl-9,10-diethoxyanthracene, 9-ethoxy-10-methylanthracene, 9,10-dipropoxyanthracene, 2-ethyl-9,10-dipropoxyanthracene, 2-t-butyl-9,10-dipropoxyanthracene, 2,3-dimethyl-9,10-dipropoxyanthracene, 9-isopropoxy-10-methylanthracene, 9,10-dibutoxyanthracene, 9,10-dibenzyloxyanthracene, 2-ethyl-9,10-dibenzyloxyanthracene, 2-t-butyl-9,10 dibenzyloxyanthracene, 2,3-dimethyl-9,10-dibenzyloxyanthracene, 9-benzyloxy-10-methylanthracene, 9,10-di-α-methylbenzyloxyanthracene, 2-ethyl-9,10-di-α-methylbenzyloxyanthracene, 2-t-butyl-9,10-di-α-methylbenzyloxyanthracene, 2,3-dimethyl-9,10-di-α-methylbenzyloxyanthracene, 9-(α-methylbenzyloxy)-10-methylanthracene, 9,10-di(2-hydroxyethoxy)anthracene and 2-ethyl-9,10-di(2-carboxyethoxy)anthracene.

Specific examples of the polycyclic aromatic compound having an alkoxy group containing a glycidyl group or a hydroxy group include 9,10-di(glycidyloxy)anthracene, 2-ethyl-9,10-di(glycidyloxy)anthracene, 2-t-butyl-9,10-di(glycidyloxy)anthracene, 2,3-dimethyl-9,10-di(glycidyloxy)anthracene, 9-(glycidyloxy)-10-methylanthracene, 9,10-di(2-vinyloxyethoxy)anthracene, 2-ethyl-9,10-di(2-vinyloxyethoxy)anthracene, 2-t-butyl-9,10-di(2-vinyloxyethoxy)anthracene, 2,3-dimethyl-9,10-di(2-vinyloxyethoxy)anthracene, 9-(2-vinyloxyethoxy)-10-methylanthracene, 9,10-di(3-methyl-3-oxetanylmethoxy)anthracene, 2-ethyl-9,10-di(3-methyl-3-oxetanylmethoxy)anthracene, 2-t-butyl-9,10-di(3-methyl-3-oxetanylmethoxy)anthracene, 2,3-dimethyl-9,10-di(3-methyl-3-oxetanylmethoxy)anthracene, 9-(3-methyl-3-oxetanylmethoxy)-10-methylanthracene, 9,10-di(p-epoxyphenylmethoxy)anthracene, 2-ethyl-9,10-di(p-epoxyphenylmethoxy)anthracene, 2-t-butyl-9,10-di(p-epoxyphenylmethoxy)anthracene, 2,3-dimethyl-9,10-di(p-epoxyphenylmethoxy)anthracene, 9-(p-epoxyphenylmethoxy)-10-methylanthracene, 9,10-di(p-vinylphenylmethoxy)anthracene, 2-ethyl-9,10-di(p-vinylphenylmethoxy)anthracene, 2-t-butyl-9,1-di(p-vinylphenylmethoxy)anthracene, 2,3-dimethyl-9,10-di(p-vinylphenylmethoxy)anthracene, 9-(p-vinylphenylmethoxy)-10-methylanthracene, 9,10-di(2-hydroxyethoxy) anthracene, 9,10-di(2-hydroxypropoxy) anthracene, 9,10-di(2-hydroxybutoxy)anthracene, 9,10-di(2-hydroxy-3-butoxypropoxy)anthracene, 9,10-di(2-hydroxy-3-(2-ethylhexyloxy)propoxy)anthracene, 9,10-di(2-hydroxy-3-allyloxypropoxy)anthracene, 9,10-di(2-hydroxy-3-phenoxypropoxy) anthracene and 9,10-di(2,3-dihydroxypropoxy)anthracene.

The photosensitizing agent may be a material which is generally known as a photopolymerization initiator. As an example of the photosensitizing agent of this type, a compound which can be activated upon the irradiation with light having a wavelength of 250 to 800 nm can be mentioned. Specific examples of the photosensitizing agent of this type include an acetophenone compound such as methoxyacetophenone; a benzoin ether compound such as benzoin propyl ether and benzoin isobutyl ether; a ketal compound such as benzyl dimethyl ketal and acetophenone diethyl ketal; a phosphine oxide compound; a titanocene compound such as bis(η5-cyclopentadienyl)titanocene; benzophenone; Michler's ketone; chlorothioxanthone; dodecylthioxanthone; dimethylthioxanthone; diethylthioxanthone; α-hydroxycyclohexyl phenyl ketone; and 2-hydroxymethylphenylpropane. Any one of the above-mentioned photosensitizing agents may be used singly, or any two or more of the above-mentioned photosensitizing agents may be used in combination.

The content of the photosensitizing agent is preferably 0.1 parts by mass or more, more preferably 0.5 parts by mass or more, and preferably 50 parts by mass or less, more preferably 30 parts by mass or less, relative to 100 parts by mass of the gas-generating agent. The content of the photosensitizing agent is preferably 0.5 parts by mass or more, more preferably 1 part by mass or more, and preferably 30 parts by mass or less, more preferably 15 parts by mass or less, relative to 100 parts by mass of the below-mentioned binder resin. When the content of the photosensitizing agent is equal to or more than the lower limit, a satisfactory photosensitization effect can be achieved. When the content of the photosensitizing agent is equal to or lower than the upper limit, the amount of a remaining material derived from the photosensitizing agent can be reduced and the generation of the gas can be facilitated satisfactorily.

With respect to the ratio of the content of the tertiary amine to the content of the photosensitizing agent, it is preferred that the photosensitizing agent and the tertiary amine are mixed in such a manner that the amount of the tertiary amine becomes equimolar to the amount of the photosensitizing agent. Since it is considered that the tertiary amine is not consumed in the generation of the gas, the tertiary amine can be added in a smaller amount than the molar equivalent amount of the gas-generating agent. In the gas-generating material 11a, the molar equivalent amount of the tertiary amine is preferably equal to or smaller than the molar equivalent amount of the gas-generating material.

The term "equivalent amount" as used herein means as follows: one nitrogen atom in the amine corresponds to one equivalent, and one molecule of the photosensitizing agent corresponds to one equivalent.

The gas-generating material 11a may additionally contain a binder resin. When the gas-generating material 11a contains a binder resin, the gas-generating material 11a can be shaped into a form such as a tablet-like form, a microparticle-like form and a film-like form easily. Further, the gas-generating agent can be held in the gas-generating material 11a rigidly. Any one of the above-mentioned binder resins may be used singly, or any two or more of the above-mentioned binder resins may be used in combination.

The binder resin is not particularly limited. As the binder resin, a proper binder resin that enables the gas-generating agent, the tertiary amine and the photosensitizing agent to be held in the gas-generating material 11a can be used. As the binder resin, a polymeric material such as poly(meth)acrylate, polyester, polyethylene, polypropylene, polystyrene, polyether, polyurethane, polycarbonate, polyamide and polyimide can be used. A copolymer of a monomer constituting the above-mentioned polymeric material may also be used, or two or more types of polymeric materials may be used in combination. Among these materials, the above-mentioned poly(meth)acrylate is preferred as the binder resin, since the gas generation efficiency can be further improved. That is, the binder resin is preferably a (meth)acrylic polymer. The (meth)acrylic polymer include a (meth)acrylic copolymer.

The SP value of the binder resin is preferably 7 or more, preferably 10.5 or less. When the SP value of the binder resin is equal to or more than the lower limit and equal to or lower than the upper limit, compatibility can be further improved.

The SP value (i.e., a parameter for solubility) can be calculated using a Fedors method (R. F. Fedors, Polym. Eng. Sci., 14, 147 (1974)).

A (meth)acrylate monomer that constitutes the poly(meth) acrylate may be any one of a linear compound and a cyclic compound. Examples of the linear compound include methyl (meth)acrylate, ethyl acrylate, butyl(meth)acrylate, 2-methylhexyl(meth)acrylate and lauryl(meth)acrylate. Examples of the cyclic compound include cyclohexyl(meth)acrylate and isobornyl(meth)acrylate. Among these compounds, methyl(meth)acrylate is preferred.

For example, the poly(meth)acrylate may be a copolymer of a (meth)acrylate monomer and a vinyl monomer that is copolymerizable with the (meth)acrylate monomer. The vinyl monomer is not particularly limited, and examples of the vinyl monomer include: vinyl monomers each containing a carboxyl group, such as (meth)acrylic acid, itaconic acid, crotonic acid, maleic acid (anhydride), fumaric acid (anhydride) and carboxyalkyl(meth)acrylates (e.g., carboxyethyl acrylate); vinyl monomers each containing a hydroxy group, such as 2-hydroxyethyl(meth)acrylate, 2-hydroxypropyl (meth)acrylate, 4-hydroxybutyl(meth)acrylate, caprolactone-modified (meth)acrylate and polyethylene glycol(meth) acrylate; and nitrogen-containing vinyl monomer, such as (meth) acrylonitrile, N-vinylpyrrolidone, N-vinylcaprolactam, N-vinyllaurilolactam, (meth)acryloylmorpholine, (meth)acrylamide, dimethyl(meth)acrylamide, N-methylol (meth)acrylamide, N-butoxymethyl(meth)acrylamide, N-isopropyl(meth)acrylamide and dimethylaminomethyl (meth)acrylate. Any one of the above-mentioned vinyl monomers may be used singly, or any two or more of the above-mentioned vinyl monomers may be used in combination.

The combination of the (meth)acrylate monomer and the vinyl monomer is not particularly limited, and examples of the combination include a combination of butyl(meth)acrylate and (meth)acrylic acid, a combination of butyl(meth) acrylate and (meth)acrylamide, and a combination of (meth) acrylic acid and N-isopropyl(meth)acrylamide. The copolymerization ratio of the (meth)acrylate monomer to the vinyl monomer preferably falls within the range from 98:2 to 51:49 (by mass).

For the purpose of further increasing the gas generation efficiency, the poly(meth)acrylate preferably comprises at least one compound selected from the group consisting of polymethyl(meth)acrylate, butyl(meth)acrylate-(meth) acrylic acid copolymer and butyl(meth)acrylate-(meth)acrylamide copolymer. For the purpose of further increasing the gas generation efficiency, the poly(meth)acrylate preferably has an amino group or a carbonyl group.

The binder resin preferably has an ultraviolet ray absorption band. The ultraviolet ray absorption band of the binder resin is preferably in a shorter wavelength than those of the ultraviolet ray absorption bands of the gas-generating agent and the photosensitizing agent.

For the purpose of further increasing the gas generation efficiency, the binder resin may have photodegradability.

The weight average molecular weight of the binder resin is preferably 50000 or more, more preferably 600000 or more, and preferably 2000000 or less, more preferably 1600000 or less. When the weight average molecular weight of the binder resin is equal to or more than the lower limit, the deterioration in the coagulation power of the binder resin itself can be prevented and the gas-generating agent, the tertiary amine and the photosensitizing agent can be held in the gas-generating material 11a rigidly. When the weight average molecular weight of the binder resin is equal to or less than the upper limit, the gas-generating material 11a can be processed into various forms readily.

The binder resin preferably has an adhesive/cohesive property. When the binder resin has an adhesive/cohesive property, it is possible to impart an adhesive/cohesive property to the gas-generating material 11a. Consequently, it becomes possible to arrange the gas-generating material 11a in the micro pump 1 readily. For example, a film-shaped gas-generating material 11a can be attached readily onto the surface of a base of the micro pump 1 or the wall surface of the inside of the base of the micro pump 1.

When the gas-generating material 11a contains the binder resin, the content of the binder resin is, for example, preferably 10 parts by mass or more, more preferably 20 parts by mass or more, further preferably 30 parts by mass or more, and preferably 300 parts by mass or less, more preferably 200 parts by mass or less, further preferably 150 parts by mass or less, relative to 100 parts by mass of the gas-generating agent.

It is preferred that the gas-generating material 11a comprises 100 parts by mass of the gas-generating agent, 0.1 to 50 parts by mass inclusive of the tertiary amine, 0.1 to 50 parts by mass inclusive of the photosensitizing agent and 11 to 300 parts by mass inclusive of the binder resin and the gas-generating material 11a contains the gas-generating agent in an amount of 10 to 90 mass % or less inclusive relative to 100 mass % of the gas-generating material 11a.

The gas-generating material 11a preferably contains a silane coupling agent. The use of the silane coupling agent enables the further improvement in the adhesion force of the gas-generating material 11a to a member of interest. Any one of the above-mentioned silane coupling agents may be used singly, or any two or more of the above-mentioned silane coupling agents may be used in combination.

It is more preferred that the gas-generating material 11a contains a silane coupling agent having an amino group. When the silane coupling agent having the amino group is used, the adhesion force of the gas-generating material 11a to a member of interest can be further improved and the reduction in the amount of a gas generated from the gas-generating material 11a upon the use of the silane coupling agent can also be prevented. That is, when the silane coupling agent having an amino group is used, the adhesion force of the gas-generating material 11a to a member of interest can be improved more effectively and the reduction in the amount of a gas generated from the gas-generating material 11a can be prevented more effectively compared in the case in which a silane coupling agent that does not have an amino group is used. That is, when the silane coupling agent having the amino group is used, the amount of the generated gas per unit time is little affected even when the gas-generating material contains the silane coupling agent. This fact is discovered by the present inventors for the first time. The tertiary amine preferably contains no silicon atom, and is preferably different from a silane coupling agent. It is preferred that the silane coupling agent having the amino group is different from the tertiary amine.

Specific examples of the silane coupling agent having the amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N,N'-bis[(3-trimethoxysilyl)propyl] ethylenediamine, 3-aminopropyltrimethoxysilane, 3-aminopropyltriethoxysilane and N-phenyl-3-aminopropyltrimethoxysilane. Other silane coupling agent having an amino group can also be used. Any one of the above-mentioned silane coupling agents each having an amino group may be used singly, or any two or more of the above-mentioned silane coupling agents each having an amino group may be used in combination.

Examples of the silane coupling agent having no amino group include: a silane coupling agent having an epoxy group, such as 3-glycidoxypropyltrimethoxysilane, 3-glycidoxypropylmethyldiethoxysilane and 3-glycidoxypropyltriethoxysilane; a silane coupling agent having an isocyanate group, such as 3-isocyanatepropyltriethoxysilane; and a silane coupling agent having a (meth)acryloyl group, such as 3-methacryloxypropyltrimethoxysilane and 3-methacryloxypropylmethyldiethoxysilane.

In the gas-generating material 11a, each of the content of the silane coupling agent and the content of the silane coupling agent having the amino group is preferably 0.0001 parts by mass or more, more preferably 0.0003 parts by mass or more, and preferably 1 part by mass or less, more preferably 0.3 parts by mass or less, relative to 100 parts by mass of the gas-generating agent. When each of the content of the silane coupling agent and the content of the silane coupling agent having an amino group is equal to or more than the lower limit, the adhesion force of the gas-generating material 11a to a member of interest is further improved. When each of the content of the silane coupling agent and the content of the silane coupling agent having the amino group is equal to or less than the upper limit, the reduction in the amount of a gas generated by the action of an excessive portion of the silane coupling agent or the silane coupling agent having an amino group can be further prevented.

The gas-generating material 11a may additionally contain a cross-linking agent, an adhesive agent, an inorganic filler and the like. It is more preferred that the gas-generating material 11a contains the cross-linking agent. However, the gas-generating material 11a may not contain the cross-linking agent. When the cross-linking agent is used, the adhesion force of the gas-generating material 11a can be further improved.

(Alternative Embodiment)

Figure 2:
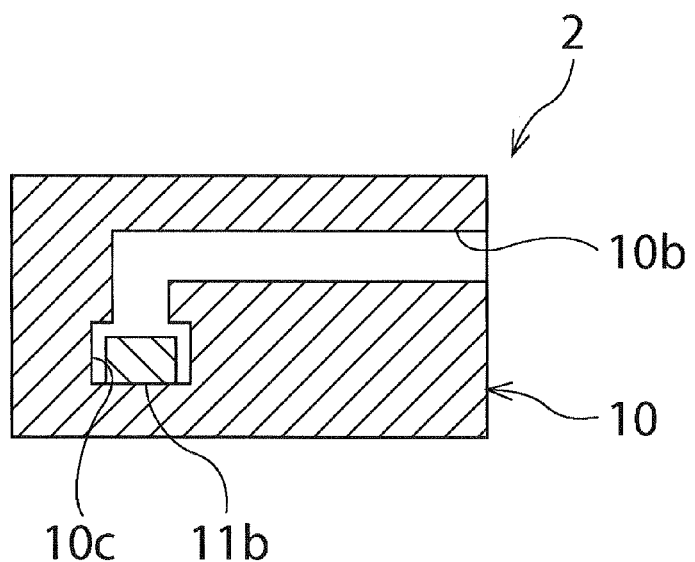
FIG. 2 illustrates a schematic cross-sectional view of a micro pump according to an alternative embodiment.

FIG. 2 illustrates a schematic cross-sectional view of a micro pump according to an alternative embodiment of the above-mentioned embodiment.

The micro pump 2 according to the alternative embodiment is different from the micro pump 1 according to the above-mentioned embodiment in the shape of the gas-generating material 11b and the shape of the base 10.

In the alternative embodiment, a micro flow path 10b is connected to a pump chamber 10c formed in the base 10. The gas-generating material 11b is formed in a block-like shape and is arranged in the pump chamber 10c.

Like the micro pump 1, the micro pump 2 according to this embodiment can also achieve high output and a long driving time.

Hereinafter, the present invention is described in more detail with reference to specific examples. The present invention is not limited to the examples mentioned below in any way, and can be practiced with proper modifications within the scope in which the subject matter of the present invention is not altered.

(Synthesis Example of Binder Resin)

A binder resin that was used in Examples and Comparative Examples was synthesized in the following manner. n-Butyl acrylate (a product manufactured by Nippon Shokubai Co., Ltd.) (97 parts by mass), acrylic acid (a product manufactured by Nippon Shokubai Co., Ltd.) (3 parts by mass), Irgacure 907 (a product manufactured by Nagase & Co., Ltd.) (0.05 parts by mass) and ethyl acetate (200 parts by mass) were mixed together to produce a mixture. Subsequently, the mixture was irradiated with ultraviolet ray for 4 hours to produce binder resin A that was an acryl copolymer. The weight average molecular weight of the resultant binder resin A was about 700000. The SP value of binder resin A fell within the range of 7 to 10.5 inclusive.

Example 1

Binder resin A (190 parts by mass) was mixed with ethyl acetate (380 parts by weight) that was a solvent. Binder resin A (190 parts by mass) (in which ethyl acetate (380 parts by mass) that was a solvent had been mixed with binder resin A), GAP4006 (a glycidylazide polymer, a product manufactured by NOF Corporation) (100 parts by mass) that was a gas-generating agent, tripropylamine (tri-n-propylamine) (10 parts by mass) that was a tertiary amine, 2,4-diethylthioxanthone (DETX-S, a product manufactured by Nippon Kayaku Co., Ltd.) (3.5 parts by mass) that was a photosensitizing agent and Tetrad X (a product manufactured by Mitsubishi Gas Chemical Company, Inc) (1 part by mass) that was a cross-linking agent were mixed together, and the mixture was processed into a film-like form. The resultant film was heated at 110° C. for 5 minutes to remove ethyl acetate that was a solvent. The resultant product was protected by a mold release PET film and stored at ambient temperature for 1 day (24 hours) to produce a film-like gas-generating material. Tetrad X that was used in Example 1 as a cross-linking agent is represented by formula (X) shown below.

[Chemical formula 4]

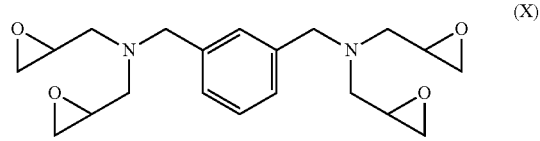

(X)

The film-like gas-generating material thus produced was used to produce a micro pump having substantially the same structure as the micro pump 1 according to the above-mentioned first embodiment.

The cross-section of a micro flow path 10b had a rectangular shape of 0.5 mm square. The length of the micro flow path 10b was 800 mm. The tip of the micro flow path 10b was opened to the atmosphere. The gas-generating material had a film-like shape having a diameter of 0.6 cm and a thickness of 50 μm.

Subsequently, the micro pump thus produced was measured with respect to the amount (μL) of a gas generated after a lapse of 24 hours and the amount (μL) of a gas generated after a lapse of 10 days. The relative value (%) of the amount of the gas generated after a lapse of 10 days (i.e., the increase or decrease of the amount of the generated gas; %), wherein the amount (μL) of the gas generated after a lapse of 24 hours was employed as a reference value (100%). The same evaluations were carried out in the below-mentioned Examples and Comparative Examples.

In the measurement of the amount of a generated gas, the amount of a gas generated after the irradiation using an ultraviolet ray LED (NS375L-5RFS, a product manufactured by Nitrid Semiconductor Co., Ltd.) having a wavelength of 380 nm for 2 minutes was measured. The method for measuring the amount of the generated gas was as follows: the micro flow path 10b was connected to a measuring pipette through a silicon tube, the inside of the connected article was filled with water, the gas-generating material was then irradiated with ultraviolet ray, and the change in the volume of the measuring pipette caused by the generated gas was read out.

Examples 2 to 18 and Comparative Examples 1 and 2

Micro pumps were produced in the same manner as in Example 1, except that the types and amounts (units: part(s) by mass) of the components to be contained were altered as shown in Tables 1 and 2. In Comparative Example 1, any tertiary amine was not used. In Comparative Example 2, any tertiary amine was not used and any cross-linking agent was not used.

The types of the tertiary amines used are as follows.
Tripropylamine (tri-n-propylamine)
1,4-Diazabicyclo[2.2.2]octane (DABCO)
Diazabicycloundecene (DBU)
Diazabicyclononene (DBN)
N,N-Diethylamino-p-toluidine The formulations and the evaluation results are shown in Tables 1 and 2 shown below.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| Binder resin | Binder resin A | 190 | 196.5 | 190 | 196.5 | 190 | 196.5 | 190 | 196.5 | 100 | 190 | 200 |
| Gas-generating agent | GAP4006 | 100 | 100 | 100 | 100 | 100 | 100 | 100 | 100 | 190 | 100 | 100 |
| Photosensitizing agent | DETX-S | 3.5 | 3.5 | 3.5 | 3.5 | 3.5 | 3.5 | 3.5 | 3.5 | 3.5 | 3.5 | 3.5 |
| Cross-linking agent | Tetrad X | 1 | 1 | 1 | 1 | 1 | 1 | 1 | 1 | 1 | 1 | 1 |
| Tertiary amine | Tripropylamine | 10 | 3.5 | | | | | | | | 10 | |
| | DABCO | | | 10 | 3.5 | | | | | | | |
| | DBU | | | | | 10 | 3.5 | | | | | |
| | DBN | | | | | | | 10 | 3.5 | | | |
| | N,N-Diethylamino-p-toluidine | | | | | | | | | | 10 | |
| Amount of gas generated after lapse of 24 hours (μL) | | 7.46 | 9.95 | 7.89 | 10.26 | 7.31 | 8.21 | 7.01 | 7.46 | 8.96 | 9.42 | 6.00 |
| Amount of gas generated after lapse of 10 days (μL) | | 7.89 | 10.97 | 7.98 | 10.35 | 7.41 | 8.19 | 6.89 | 7.26 | 8.99 | 9.46 | 5.98 |
| Increase or decrease of amount of generated gas (%) | | 105.8 | 110.3 | 101.1 | 100.9 | 101.4 | 99.8 | 98.3 | 97.3 | 100.3 | 100.4 | 99.7 |
| Photosensitizing agent/tertiary amine (molar equivalence ratio) | | 0.66 | 1.87 | 1.67 | 4.79 | 1.23 | 3.52 | 1.51 | 4.19 | 0.66 | — | — |

TABLE 2

| | | Ex. 11 | Ex. 12 | Ex. 13 | Ex. 14 | Ex. 15 | Ex. 16 | Ex. 17 | Ex. 18 | Comp. Ex. 2 |
|---|---|---|---|---|---|---|---|---|---|---|
| Binder resin | Binder resin A | 190 | 196.5 | 190 | 196.5 | 190 | 196.5 | 190 | 196.5 | 200 |
| Gas-generating agent | DBSN | 100 | 100 | 100 | 100 | 100 | 100 | 100 | 100 | 100 |
| Photosensitizing agent | DETX-S | 3.5 | 3.5 | 3.5 | 3.5 | 3.5 | 3.5 | 3.5 | 3.5 | 3.5 |
| Cross-linking agent | Tetrad X | 1 | 1 | 1 | 1 | 1 | 1 | 1 | 1 | |
| Tertiary amine | Tripropylamine | 10 | 3.5 | | | | | | | |
| | DABCO | | | 10 | 3.5 | | | | | |
| | DBU | | | | | 10 | 3.5 | | | |
| | DBN | | | | | | | 10 | 3.5 | |
| | N,N-Diethylamino-p-toluidine | | | | | | | | | |
| Amount of gas generated after lapse of 24 hours (μL) | | 8.20 | 10.10 | 8.60 | 11.21 | 8.04 | 9.03 | 7.71 | 8.21 | 6.60 |
| Amount of gas generated after lapse of 10 days (μL) | | 8.29 | 11.01 | 8.30 | 10.76 | 7.96 | 9.20 | 7.46 | 8.96 | 6.20 |
| Increase or decrease of amount of generated gas (%) | | 101.10 | 109.01 | 96.51 | 95.99 | 98.99 | 101.87 | 96.74 | 109.19 | 93.94 |
| Photosensitizing agent/tertiary amine (molar equivalence ratio) | | 0.66 | 1.87 | 1.67 | 4.79 | 1.23 | 3.52 | 1.51 | 4.19 | — |

Example 19

In a micro pump produced in the same manner as in Example 1, the irradiation with light having a wavelength of 380 nm from an ultraviolet ray LED (Nitrid Semiconductor Co., Ltd. NS375L-5RFS) was carried out, and the amount (μL) of a generated gas was measured.

Comparative Example 3

In a micro pump produced in the same manner as in Comparative Example 1, the irradiation with light having a wavelength of 380 nm from an ultraviolet ray LED was carried out in the same manner as in Example 19, and the amount (μL) of a generated gas was measured.

Examples 20 to 26 and Comparative Examples 4 and 5

In each of micro pumps produced in the same manner as in Example 19 except that the photosensitizing agents and amines shown in Tables 3 and 4 were used, the irradiation with light having a wavelength of 380 nm from an ultraviolet ray LED was carried out in the same manner as in Example 19, and the amount (μL) of a generated gas was measured.

Comparative Examples 6 to 12

In each of micro pumps produced in the same manner as in Example 19 except that the photosensitizing agents shown in Table 4 were used and any amine was not used, the irradiation with light having a wavelength of 380 nm from an ultraviolet ray LED was carried out in the same manner as in Example 19, and the amount (μL) of a generated gas was measured.

Figure 3:
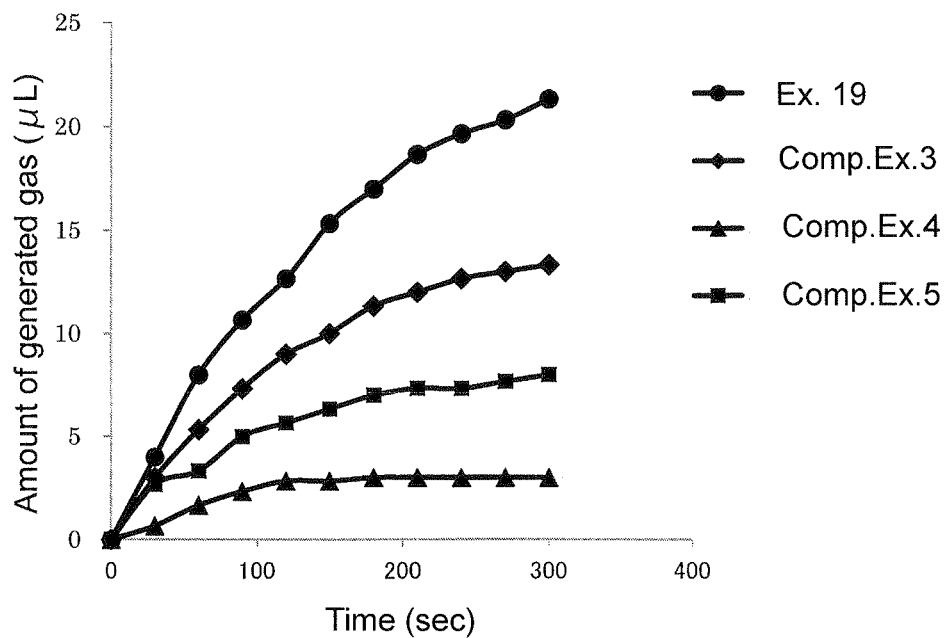
FIG. 3 illustrates a graph showing the amounts (integrated values) of gases generated by micro pumps produced in Example 19 and Comparative Examples 3 to 5.
Figure 4:
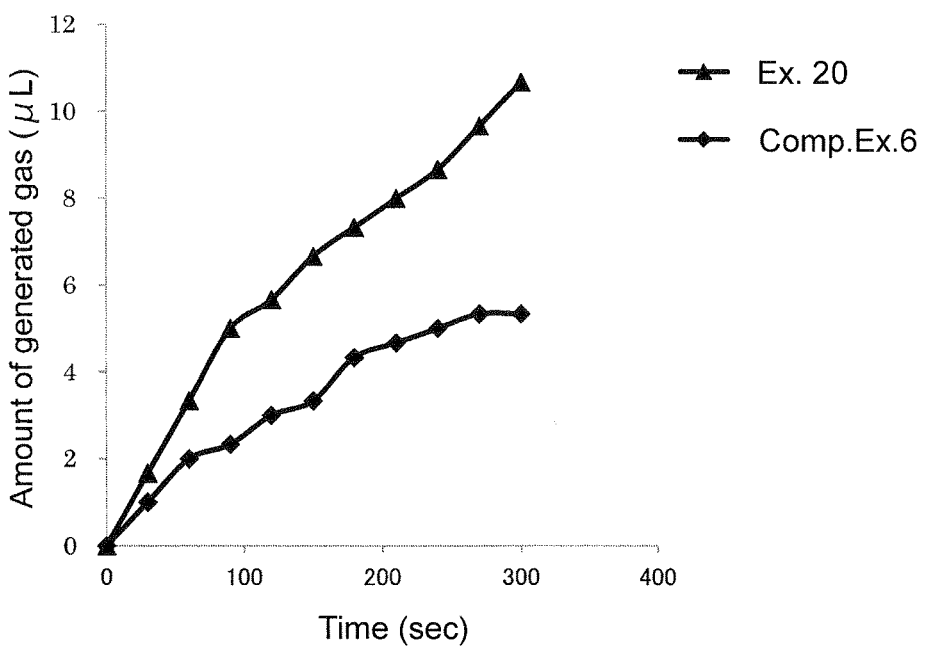
FIG. 4 illustrates a graph showing the amounts (integrated values) of gases generated by micro pumps produced in Example 20 and Comparative Example 6.
Figure 5:
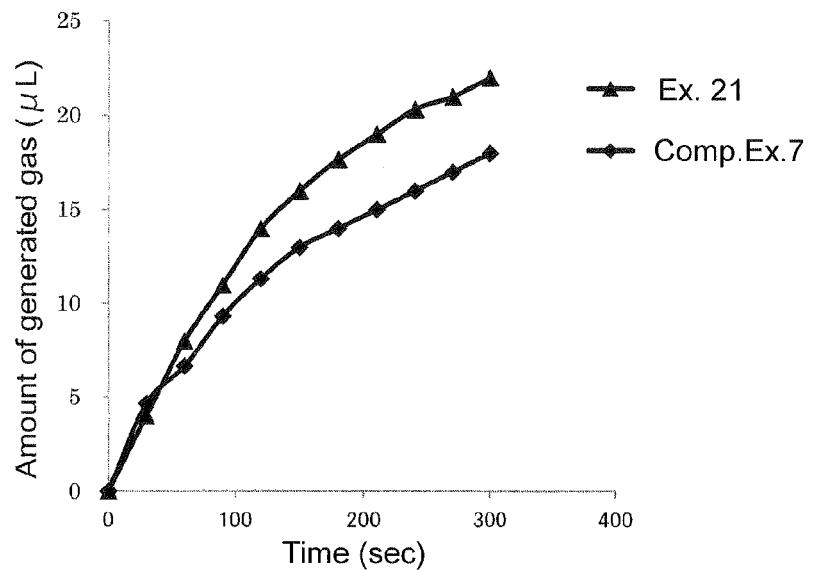
FIG. 5 illustrates a graph showing the amounts (integrated values) of gases generated by micro pumps produced in Example 21 and Comparative Example 7.
Figure 6:
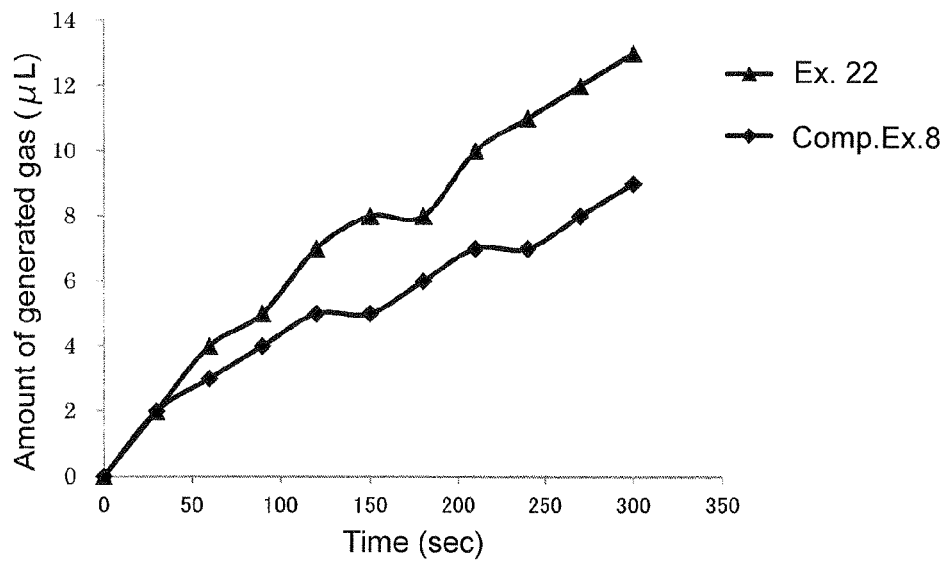
FIG. 6 illustrates a graph showing the amounts (integrated values) of gases generated by micro pumps produced in Example 22 and Comparative Example 8.
Figure 7:
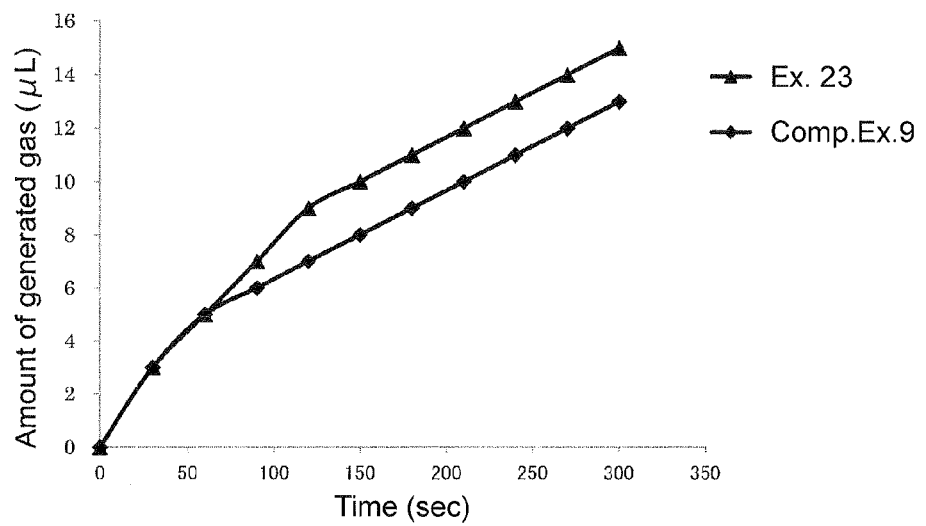
FIG. 7 illustrates a graph showing the amounts (integrated values) of gases generated by micro pumps produced in Example 23 and Comparative Example 9.
Figure 8:
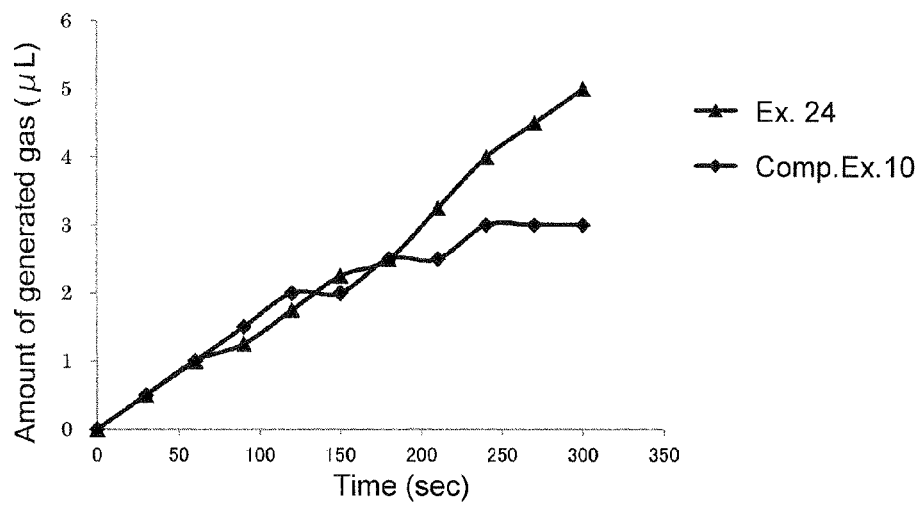
FIG. 8 illustrates a graph showing the amounts (integrated values) of gases generated by micro pumps produced in Example 24 and Comparative Example 10.
Figure 9:
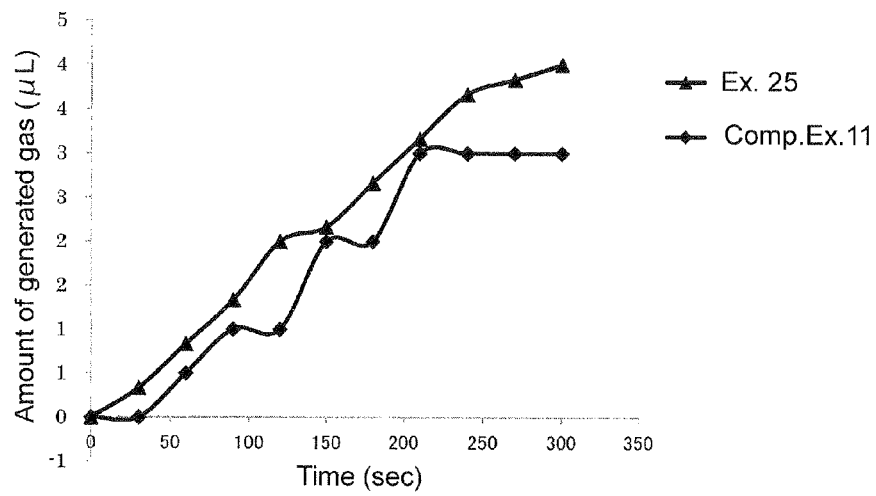
FIG. 9 illustrates a graph showing the amounts (integrated values) of gases generated by micro pumps produced in Example 25 and Comparative Example 11.
Figure 10:
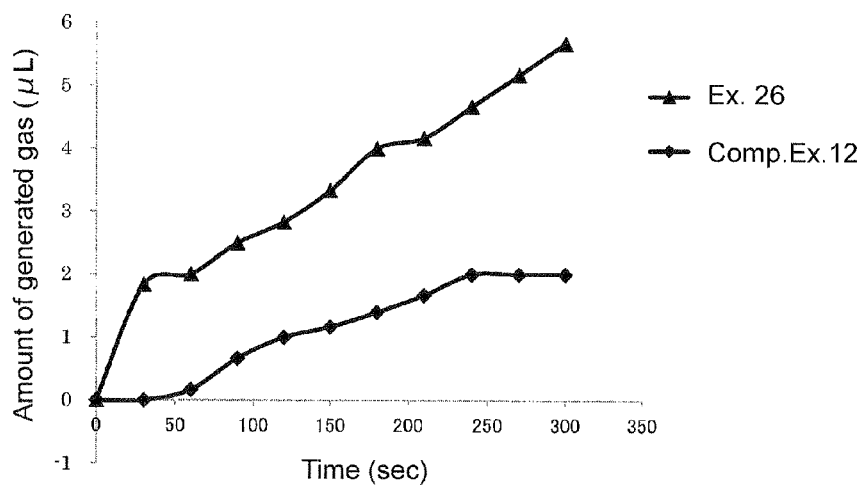
FIG. 10 illustrates a graph showing the amounts (integrated values) of gases generated by micro pumps produced in Example 26 and Comparative Example 12.

The results of Examples 19 to 26 are shown in Table 3 below, and the results of Comparative Examples 3 to 12 are shown in Table 4 below. The results of Example 19 and Comparative Examples 3, 4 and 5 are shown in FIG. 3, the results of Example 20 and Comparative Example 6 are shown in FIG. 4, the results of Example 21 and Comparative Example 7 are shown in FIG. 5, the results of Example 22 and Comparative Example 8 are shown in FIG. 6, the results of Example 23 and Comparative Example 9 are shown in FIG. 7, the results of Example 24 and Comparative Example 10 are shown in FIG. 8, the results of Example 25 and Comparative Example 11 are shown in FIG. 9, and the results of Example 26 and Comparative Example 12 are shown in FIG. 10. Each of the amounts of generated gases shown in Tables 3 and 4 and FIGS. 3 to 10 is an integrated value.

TABLE 3

| | | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Photosensitizing agent | | 2,4-Diethyl-thioxanthone | 2-Chloro-pheno-thiazine | 2-Isopropyl-thioxanthone | 2-Chloro-thioxanthone | 10-Methyl-9(10H)acridone | 9,10-Diethoxy-anthracene | 9,10-Dipropoxy-anthracene | 9,10-Dibutoxy-anthracene |
| Amine | | Tripropyl-amine | Tripropyl-amine | Tripropyl-amine | Tripropyl-amine | Tripropyl-amine | Tripropyl-amine | Tripropyl-amine | Tripropyl-amine |
| Integrated value of amount (μL) of generated gas | −30 seconds | 4 | 2 | 4 | 2 | 3 | 1 | 0 | 2 |
| | −60 seconds | 8 | 3 | 8 | 4 | 5 | 1 | 1 | 2 |
| | −90 seconds | 11 | 5 | 11 | 5 | 7 | 1 | 1 | 3 |
| | −120 seconds | 13 | 6 | 14 | 7 | 9 | 2 | 2 | 3 |
| | −150 seconds | 15 | 7 | 16 | 8 | 10 | 2 | 2 | 3 |
| | −180 seconds | 17 | 7 | 18 | 8 | 11 | 3 | 3 | 4 |
| | −210 seconds | 19 | 8 | 19 | 10 | 12 | 3 | 3 | 4 |
| | −240 seconds | 20 | 9 | 20 | 11 | 13 | 4 | 4 | 5 |
| | −270 seconds | 20 | 10 | 21 | 12 | 14 | 5 | 4 | 5 |
| | −300 seconds | 21 | 11 | 22 | 13 | 15 | 5 | 4 | 6 |

TABLE 4

| | | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|
| Photosensitizing agent | | 2,4-Diethyl-thio-xanthone | 2,4-Diethyl-thio-xanthone | 2,4-Diethyl-thio-xanthone | 2-Chloro-pheno-thiazine | 2-Iso-propyl-thio-xanthone | 2-Chloro-thio-xanthone | 10-Methyl-9(10H)acridone | 9,10-Diethoxy-anthracene | 9,10-Di-propoxy-anthra-cene | 9,10-Di-butoxy-anthra-cene |
| Amine | | None | Tri-ethylene-tetramine | Tetra-ethylene-pentamine | None | None | None | None | None | None | None |
| Integrated value of amount (μL) of generated gas | −30 seconds | 3 | 1 | 3 | 1 | 5 | 2 | 3 | 1 | 0 | 0 |
| | −60 seconds | 5 | 2 | 3 | 2 | 7 | 3 | 5 | 1 | 1 | 0 |
| | −90 seconds | 7 | 2 | 5 | 2 | 9 | 4 | 6 | 2 | 1 | 1 |
| | −120 seconds | 9 | 3 | 6 | 3 | 11 | 5 | 7 | 2 | 1 | 1 |
| | −150 seconds | 10 | 3 | 6 | 3 | 13 | 5 | 8 | 2 | 2 | 1 |
| | −180 seconds | 11 | 3 | 7 | 4 | 14 | 6 | 9 | 3 | 2 | 1 |
| | −210 seconds | 12 | 3 | 7 | 5 | 15 | 7 | 10 | 3 | 3 | 2 |
| | −240 seconds | 13 | 3 | 7 | 5 | 16 | 7 | 11 | 3 | 3 | 2 |
| | −270 seconds | 13 | 3 | 8 | 5 | 17 | 8 | 12 | 3 | 3 | 2 |
| | −300 seconds | 13 | 3 | 8 | 5 | 18 | 9 | 13 | 3 | 3 | 2 |

Example 27

With respect to each of 6 micro pumps produced in the same manner as in Example 1, the amount (μL) of a gas generated upon the irradiation with light having a wavelength of 380 nm from an ultraviolet ray LED for 2 minutes was measured 1 day, 3 days, 6 days, 9 days, 16 days and 30 days after the production of the micro pumps.

Comparative Example 13

With respect to each of 6 micro pumps produced in the same manner as in Comparative Example 4, the amount (μL) of a gas generated upon the irradiation with light having a wavelength of 380 nm from an ultraviolet ray LED for 2 minutes was measured 1 day, 3 days, 6 days and 9 days after the production of the micro pumps.

Comparative Example 14

With respect to each of 6 micro pumps produced in the same manner as in Comparative Example 5, the amount (μL) of a gas generated upon the irradiation with light having a wavelength of 380 nm from an ultraviolet ray LED for 2 minutes was measured 1 day, 3 days, 6 days and 9 days after the production of the micro pumps.

Comparative Example 15

With respect to each of 6 micro pumps produced in the same manner as in Example 1 except that dodecylamine was used in place of tripropylamine, the amount (μL) of a gas generated upon the irradiation with light having a wavelength of 380 nm from an ultraviolet ray LED for 2 minutes was measured 1 day, 3 days, 6 days and 9 days after the production of the micro pumps.

Figure 11:
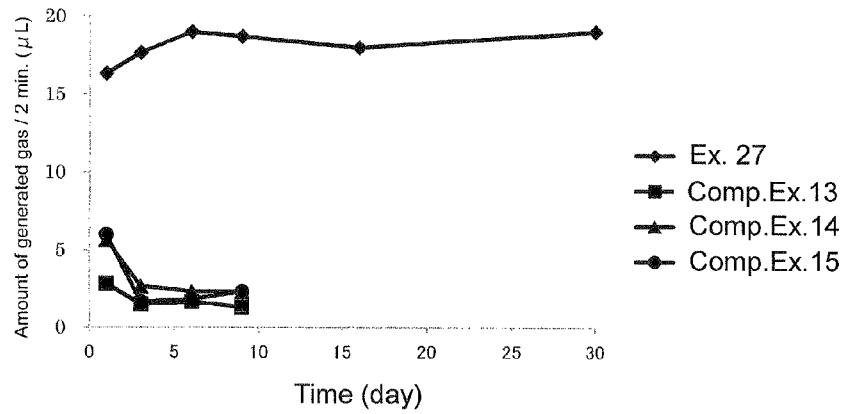
FIG. 11 illustrates a graph showing the amounts (integrated values) of gases generated by micro pumps produced in Example 27 and Comparative Examples 13 to 15.

The results of Example 27 and Comparative Examples 13, 14 and 15 are shown in Table 5 below and FIG. 11. Each of the amounts of generated gases shown in Tables 5 and 11 is an integrated value. As is apparent from the comparison between Example 27 and Comparative Examples 13 to 15, it is found that a gas-generating material containing a tertiary amine has superior storage stability compared with that of a gas-generating material containing a primary amine or a secondary amine.

TABLE 5

| | | Amount of generated gas (μL) | | | | | |
|---|---|---|---|---|---|---|---|
| | Amine | 1 Day | 3 Days | 6 Days | 9 Days | 16 Days | 30 Days |
| Ex. 27 | Tripropylamine | 16 | 18 | 19 | 18.7 | 18 | 19 |
| Comp. Ex. 13 | Triethylenetetramine | 3 | 2 | 2 | 1.3 | — | — |
| Comp. Ex. 14 | Tetraethylenepentamine | 6 | 3 | 2 | 2.3 | — | — |
| Comp. Ex. 15 | Dodecylamine | 6 | 2 | 2 | 2.3 | — | — |

Example 28

Binder resin A (100 parts by mass) and ethyl acetate (567 parts by weight) that was a solvent were mixed together. Binder resin A (100 parts by mass) (in which ethyl acetate (567 parts by mass) that was a solvent had been mixed with binder resin A), DBSN (4-dodecylbenzenesulfonylazide, a product manufactured by Toyobo Co., Ltd.) (50 parts by mass) that was a gas-generating agent, tripropylamine (tri-n-propylamine) (3.5 parts by mass) that was a tertiary amine, IPX (a product manufactured by DKSH Japan K.K.) (2 parts by mass) that was a photosensitizing agent and E-AX (a product manufactured by Soken Chemical & Engineering Co., Ltd., a 5% solution in toluene) (0.5 parts by mass) that was a cross-linking agent were mixed together, and the resultant mixture was processed into a film-like form. The resultant film was heated at 110° C. for 5 minutes to remove ethyl acetate that was a solvent. The resultant film was protected by a mold release PET film and was stored at ambient temperature for 1 day (24 hours) to produce a film-like gas-generating material. The gas-generating material thus produced was used to produce a micro pump in the same manner as in Example 1.

Examples 29 to 31

Gas-generating materials were produced and micro pumps were produced using the gas-generating materials in the same manner as in Example 28, except that the types and amounts (unit: part(s) by mass) of components added were altered as shown in Table 6 below. In Examples 30 and 31, GAP5003 (a glycidylazide polymer, a product manufactured by NOF Corporation) was used as a gas-generating agent.

Each of the micro pumps produced in Examples 28 to 31 was evaluated in the same manner as in Example 1. The results of the evaluation are shown in Table 6 below. With respect to each of the gas-generating materials produced in Examples 28 to 31, like the gas-generating materials produced in Examples 1 to 27, the degree of reduction in the amount of a generated gas was small after a lapse of 24 hours and after a lapse of 10 days, and the relative amount of a gas generated after a lapse of 10 days (i.e., the increase or decrease of the amount of the generated gas: %) (wherein the amount (μL) of the gas generated after a lapse of 24 hours was employed as a reference value (100%)) fells within the range of 95 to 105% inclusive and the storage stability was excellent, because a tertiary amine was used.

TABLE 6

| | | Ex. 28 | Ex. 29 | Ex. 30 | Ex. 31 |
|---|---|---|---|---|---|
| Binder resin | Binder resin A | 100 | 100 | 100 | 190 |
| Gas-generating agent | DBSN | 50 | 50 | | |
| | GAP5003 | | | 110 | 110 |
| Photosensitizing agent | IPX | 2 | 2 | 2 | 2 |
| Cross-linking agent | E-AX | 0.5 | 0.5 | 0.5 | 0.5 |
| Tertiary amine | Tripropylamine | 3.5 | 3.5 | 3.5 | 3.5 |
| Amount of generated gas (μL), for 120 seconds | | 13.6 | 12 | 19 | 18 |

Example 32

Binder resin A (100 parts by mass) and ethyl acetate (567 parts by weight) that was a solvent were mixed together. Binder resin A (100 parts by mass) (in which ethyl acetate (567 parts by mass) that was a solvent had been mixed with binder resin A), GAP4006 (a glycidylazide polymer, a produce manufactured by NOF Corporation) (110 parts by mass) that was a gas-generating agent, N-2-(aminoethyl)-3-aminopropylmethyldimethoxysilane (KBM-602, a product manufactured by Shin-Etsu Chemical Co., Ltd.) (0.001 parts by mass) that was a silane coupling agent having an amino group, tripropylamine (tri-n-propylamine) (2 parts by mass) that was a tertiary amine, IPX (a product manufactured by DKSH Japan K.K.) (3.5 parts by mass) that was a photosensitizing agent and E-AX (a product manufactured by Soken Chemical & Engineering Co., Ltd., a 5% solution in toluene) (0.5 parts by mass) that was a cross-linking agent were mixed together, and the resultant mixture was processed into a film-like form. The resultant film was heated at 110° C. for 5 minutes to remove ethyl acetate that was a solvent. The resultant product was protected by a mold release PET film, and the resultant product was stored at ambient temperature for 1 day (24 hours) to produce a film-like gas-generating material. The gas-generating material thus produced was used to produce a micro pump in the same manner as in Example 1.

Examples 33 to 38

Gas-generating materials were produced and micro pumps were produced using the gas-generating materials in the same manner as in Example 32, except that the types and amounts (unit: part(s) by mass) of components added were altered as shown in Table 7 below. In Examples 33 to 35, a silane coupling agent having an amino group was used. In Examples 36 and 37, a silane coupling agent having no amino group was used. In Example 38, any silane coupling agent was not used.

The types of the silane coupling agents used are as follows.
N,N-Bis[(3-trimethoxysilyl)propyl]ethylenediamine (a product manufactured by Gelest Inc.)
3-Aminopropyltrimethoxysilane (KBM-903, a product manufactured by Shin-Etsu Chemical Co., Ltd.)
3-Aminopropyltriethoxysilane (KBE-903, a product manufactured by Shin-Etsu Chemical Co., Ltd.)
3-Glycidoxypropyltriethoxysilane (KBE-403, a product manufactured by Shin-Etsu Chemical Co., Ltd.)
3-Methacryloxypropylmethyldiethoxysilane (KBE-502, a product manufactured by Shin-Etsu Chemical Co., Ltd.)

With respect to Examples 32 to 38, the evaluation was carried out on the following evaluation items.

(1) Amount of Generated Gas

In the measurement of the amount of a generated gas, the amount of a gas generated upon the irradiation with ultraviolet ray having a wavelength of 380 nm from an LED (NS375L-5RFS, a product manufactured by Nitrid Semiconductor Co., Ltd.) for 120 seconds was measured. The method for measuring the amount of the generated gas was the same as that employed in Example 1.

(2) Adhesion Force

An adhesion force was evaluated by carrying out a 180-degree peel procedure using a tensile tester (AG-IS, a product manufactured by Shimadzu Corporation). The conditions for the measurement were as follows: a peel rate: 300 mm/min, a peel width: 25 mm, and a measurement temperature: 23° C.

(3) Anchor

Peel strength was measured by adhering a paste-applied surface of a cellophane tape and the paste-applied surface of the resultant film-like gas-generating material to each other and carrying out a 90-degree peel procedure. The method for the measurement was the same as that employed for the measurement of an adhesion force.

The results are shown in Table 7 below. With respect to each of the gas-generating materials produced in Examples 32 to 38, the degree of reduction in the amount of a generated gas was small after a lapse of 24 hours and after a lapse of 10 days, and the relative amount of a gas generated after a lapse of 10 days (i.e., the increase or decrease of the amount of the generated gas: %) (wherein the amount (μL) of the gas generated after a lapse of 24 hours was employed as a reference value (100%)) fells within the range of 90 to 105% inclusive and the storage stability was excellent, because a tertiary amine was used.

TABLE 7

|  |  | Ex. 32 | Ex. 33 | Ex. 34 | Ex. 35 | Ex. 36 | Ex. 37 | Ex. 38 |
| --- | --- | --- | --- | --- | --- | --- | --- | --- |
| Binder resin | Binder resin A | 100 | 100 | 100 | 100 | 100 | 100 | 100 |
| Gas-generating agent | GAP4006 | 110 | 110 | 110 | 110 | 110 | 110 | 110 |
| Photosensitizing agent | IPX | 3.5 | 3.5 | 3.5 | 3.5 | 3.5 | 3.5 | 3.5 |
| Cross-linking agent | E-AX | 0.5 | 0.5 | 0.5 | 0.5 | 0.5 | 0.5 | 0.5 |
| Tertiary amine | Tripropylamine | 2 | 2 | 2 | 2 | 2 | 2 | 2 |
| Silane coupling agent | KBM-602 | 0.001 |  |  |  |  |  |  |
| (with amino group) | N,N'-Bis[(3-trimethoxysilyl)propyl]ethylenediamine |  | 0.001 |  |  |  |  |  |
|  | KBM-903 |  |  | 0.001 |  |  |  |  |
|  | KBE-903 |  |  |  | 0.001 |  |  |  |
| Silane coupling agent | KBE-403 |  |  |  |  | 0.001 |  |  |
| (without amino group) | KBE-502 |  |  |  |  |  | 0.001 |  |
| Amount of generated gas (μL), for 120 seconds |  | 24 | 24 | 23 | 23 | 18 | 19 | 25 |
| Adhesion force (N/25 mm) |  | 0.330 | 0.145 | 0.165 | 0.120 | 0.011 | 0.009 | 0.005 |
| Anchor (N/16 mm) |  | 1.31 | 0.85 | 1.71 | 1.45 | 0.29 | 0.09 | 0.28 |

EXPLANATION OF SYMBOLS

1, 2: Micro pump
10: Base
10a: Main surface
10b: Micro flow path
10c: Pump chamber
11a, 11b: Gas-generating material
12: Gas barrier layer

The invention claimed is:

1. A gas-generating material comprising a gas-generating agent which is an azo compound or an azide compound, a tertiary amine, a photosensitizing agent and a binder resin.

2. The gas-generating material according to claim 1, wherein the tertiary amine comprises at least one component selected from the group consisting of a cyclic amine, a trialkylamine and an aromatic amine.

3. The gas-generating material according to claim 1,
wherein the content of the tertiary amine is 0.1 to 50 parts by mass inclusive relative to 100 parts by mass of the gas-generating agent.

4. The gas-generating material according to claim 1,
wherein the azide compound has a sulfonylazide group or an azidomethyl group.

5. The gas-generating material according to claim 1,
wherein the content of the photosensitizing agent is 0.1 to 50 parts by mass inclusive relative to 100 parts by mass of the gas-generating agent.

6. The gas-generating material according to claim 1,
wherein the photosensitizing agent comprises at least one component selected from the group consisting of a thioxanthone compound, a phenothiazine compound, an anthracene compound and an acridone compound.

7. The gas-generating material according to claim 1,
wherein the gas-generating material additionally comprises a silane coupling agent.

8. A micro pump comprising a gas-generating material according to claim 1 and
a base having a micro flow path formed therein,
wherein the gas-generating material is so arranged that a gas generated in the gas-generating material is supplied to the micro flow path.

9. The micro pump according to claim 8,
wherein the content of the tertiary amine in the gas-generating material is 0.1 to 50 parts by mass inclusive relative to 100 parts by mass of the gas-generating agent.

10. The micro pump according to claim 8,
wherein the azide compound has a sulfonylazide group or an azidomethyl group.

11. The micro pump according to claim 8,
wherein the content of the photosensitizing agent in the gas-generating material is 0.1 to 50 parts by mass inclusive relative to 100 parts by mass of the gas-generating agent.

12. The micro pump according to claim 8,
wherein the photosensitizing agent comprises at least one component selected from the group consisting of a thioxanthone compound, a phenothiazine compound, an anthracene compound and an acridone compound.

13. The micro pump according to claim 8,
wherein the gas-generating material additionally comprises a silane coupling agent.

14. The gas-generating material according to claim 2,
wherein the content of the tertiary amine is 0.1 to 50 parts by mass inclusive relative to 100 parts by mass of the gas-generating agent.

15. The gas-generating material according to claim 2,
wherein the azide compound has a sulfonylazide group or an azidomethyl group.

16. The gas-generating material according to claim 2,
wherein the content of the photosensitizing agent is 0.1 to 50 parts by mass inclusive relative to 100 parts by mass of the gas-generating agent.

17. The gas-generating material according to claim 2,
wherein the photosensitizing agent comprises at least one component selected from the group consisting of a thioxanthone compound, a phenothiazine compound, an anthracene compound and an acridone compound.

18. The gas-generating material according to claim 2,
wherein the gas-generating material additionally comprises a silane coupling agent.

19. A micro pump comprising a gas-generating material according to claim 2 and
a base having a micro flow path formed therein,
wherein the gas-generating material is so arranged that a gas generated in the gas-generating material is supplied to the micro flow path.

20. The micro pump according to claim 19,
wherein the content of the tertiary amine in the gas-generating material is 0.1 to 50 parts by mass inclusive relative to 100 parts by mass of the gas-generating agent.

21. The micro pump according to claim 19,
wherein the azide compound has a sulfonylazide group or an azidomethyl group.

22. The micro pump according to claim 19,
wherein the content of the photosensitizing agent in the gas-generating material is 0.1 to 50 parts by mass inclusive relative to 100 parts by mass of the gas-generating agent.

23. The micro pump according to claim 19,
wherein the photosensitizing agent comprises at least one component selected from the group consisting of a thioxanthone compound, a phenothiazine compound, an anthracene compound and an acridone compound.

24. The micro pump according to claim 19,
wherein the gas-generating material additionally comprises a silane coupling agent.

\* \* \* \* \*